United States Patent [19]

Tateishi

[11] Patent Number: 5,568,823
[45] Date of Patent: Oct. 29, 1996

[54] FUEL CONTROL VALVE LOCATED IN A FUEL TANK

[75] Inventor: Yosuke Tateishi, Anjo city, Japan

[73] Assignee: Aisin Seiki Kabushiki Kaisha, Kariya City, Japan

[21] Appl. No.: 413,227

[22] Filed: Mar. 30, 1995

[30] Foreign Application Priority Data

Mar. 31, 1994 [JP] Japan .................... 6-062719

[51] Int. Cl.$^6$ ................................. F16K 31/22
[52] U.S. Cl. .......................... 137/202; 137/43
[58] Field of Search ....................... 137/43, 202

[56] References Cited

U.S. PATENT DOCUMENTS

| 4,646,772 | 3/1987 | Bergsma | 137/43 X |
| 4,655,238 | 4/1987 | Szlaga | 137/43 |
| 4,666,058 | 5/1987 | Harris | 137/43 X |
| 4,679,581 | 7/1987 | Mears | 137/202 X |
| 5,449,029 | 9/1995 | Harris | 137/202 X |

FOREIGN PATENT DOCUMENTS 5-25309  6/1993  Japan .

Primary Examiner—Gerald A. Michalsky
Attorney, Agent, or Firm—Oblon, Spivak, McClelland, Maier & Neustadt, P.C.

[57] ABSTRACT

A fuel control valve is located in a fuel tank and comprising an outlet, a liquid inlet and a vapor inlet. The valve permits to flow fuel vapor only from the inlets to the outlet and prevents drops of fuel liquid from flowing to the outlet. A float is located in the valve and prevents the drops of the fuel from flowing between the liquid inlet and the outlet. A wrapper is opposed to the vapor inlet and prevents the drops of the fuel from flowing between the vapor inlet and the outlet.

4 Claims, 2 Drawing Sheets

FUEL CONTROL VALVE LOCATED IN A FUEL TANK

BACKGROUND OF THE INVENTION

The present invention relates to a fuel control valve located in a fuel tank.

A conventional fuel control valve, as shown in FIGS. 3, 4, is disclosed in a Japanese Utility Model Publication No.5(1993)-25309. Referring to FIG. 3, a pipe 109 has a fluid communication with a fuel tank 100 for a motor vehicle (not shown). A nozzle 110 is inserted into an upper end of the pipe 109 and supplies a fuel (gasoline and so on) into the tank 100. A sensor 111 is fixed to the pipe 109 and detects an insertion of the nozzle 110.

Ventilation pipe 104 has a fluid communication with a vapor portion 101 of the tank 100. Even though the tank 100 is filled up! by the fuel, fuel vapor exists in the vapor portion 101. A check valve 102 and a canister 103 are located in the pipe 104. The check valve 102 keeps an inner pressure of the tank 100 constant. The fuel vapor in the tank 100 is absorbed by the canister 103 via the pipe 104, mainly when the vehicle runs or stops.

Ventilation pipe 107 also has fluid communication with the tank 100. A fuel control valve 108 located in the tank 100 is fixed to a lower end of the pipe 107 extending into the tank 100. A solenoid valve 105 and a canister 106 are located in the pipe 107. When fuel is supplied into the tank 100, a large amount of fuel vapor is generated in the tank 100. Thus, the valve 105 is opened when the sensor 111 detects the insertion of the nozzle 110. The large amount of fuel vapor in the tank 100 is absorbed by the canister 106 via the pipe 107.

Referring to FIG. 4, the fuel control valve 108 is specifically shown. The valve 108 comprises a cup-shaped body 120, a cover 121 and a float 123. Liquid passages 125 are formed on a bottom of the body 120. An upper opening of the body 120 is closed by the cover 122. The lower end of the pipe 107 is inserted into an outlet 122 of the cover 121. A tapered seat 129 of the cover 121 is formed continuously with the outlet 122. A spherical head of the float 123 is engageable with the tapered seat 129. Vapor inlets 124 are formed in the tapered seat 129. A horizontal flange 126 is formed on lower end of the inlets 124. A fuel passage 128 is formed between the inlets 124 and the outlet 122 when the float is spaced apart from the seat 129.

When fuel is supplied into the tank 100, the fuel level in the tank 100 is lower than the position of the float 123. Thus, the float 123 is spaced from the seat 129 and a large amount of fuel vapor flows from the inlets 124 to the outlet 122 through the passage 128. When the tank 100 is filled up, the float 123 presses on the seat 129. As a result, the passage 128 is shut off.

As the vehicle consumes the fuel in the tank 100, the fuel level therein becomes low. As a result, the float 123 becomes spaced apart from the seat 129 again. When the vehicle runs on, the vehicle and the tank 100 vibrate. Therefore, fuel in the tank 100 splashes about and drops of the fuel flow to outlet 122 over the flange 126.

SUMMARY OF THE INVENTION

It is an object of the present invention to prevent drops of a fuel from flowing to an outlet of a fuel control valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
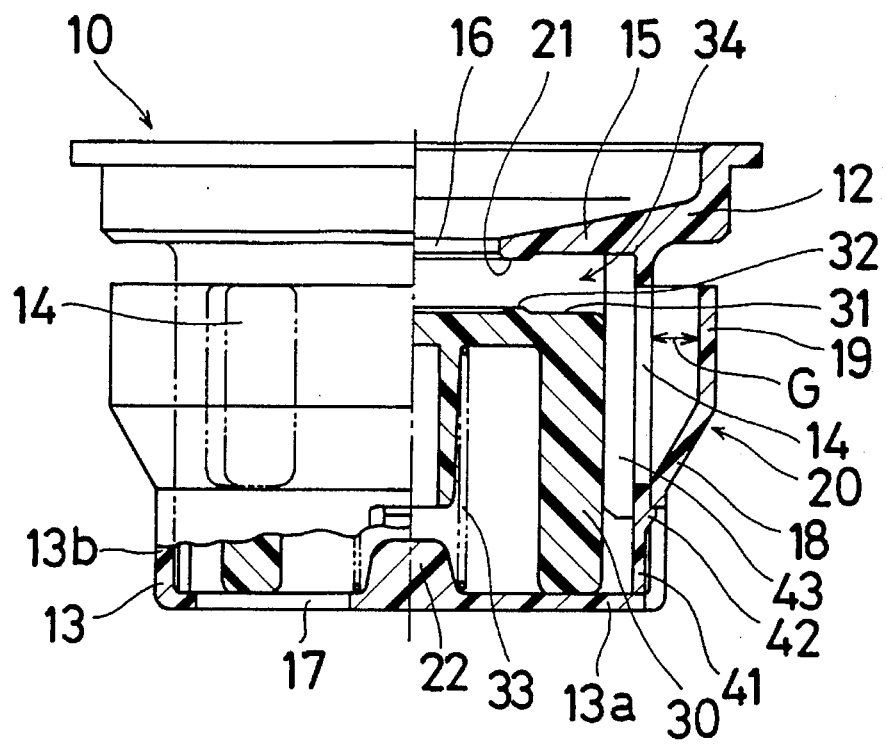
FIG. 1 is a partial sectional view of a fuel control valve according to an embodiment of the invention.
Figure 2:
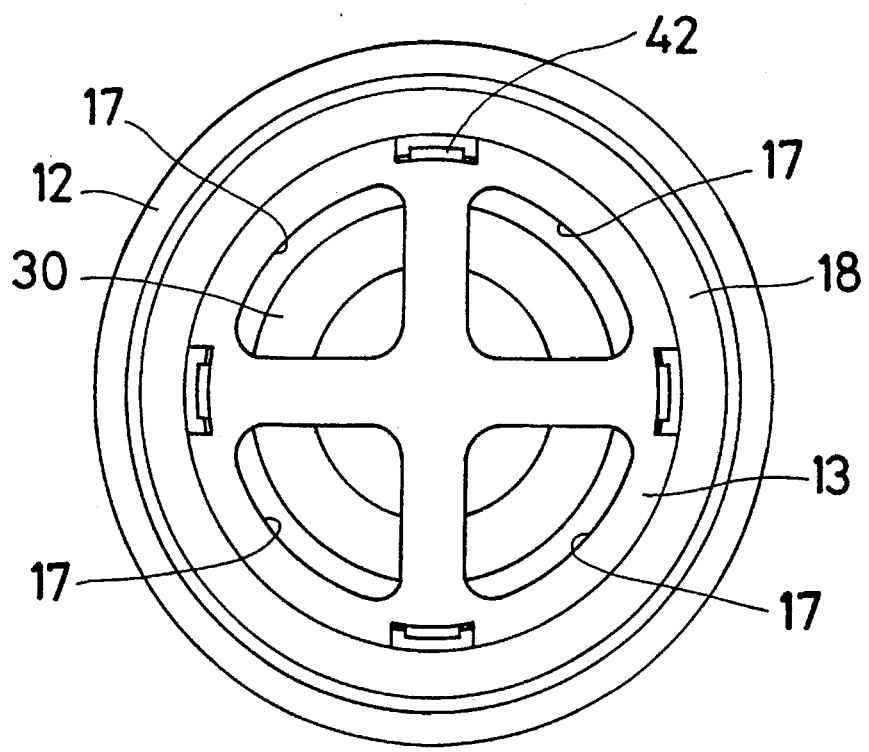
FIG. 2 is a bottom view of the valve of FIG. 1.
Figure 3:
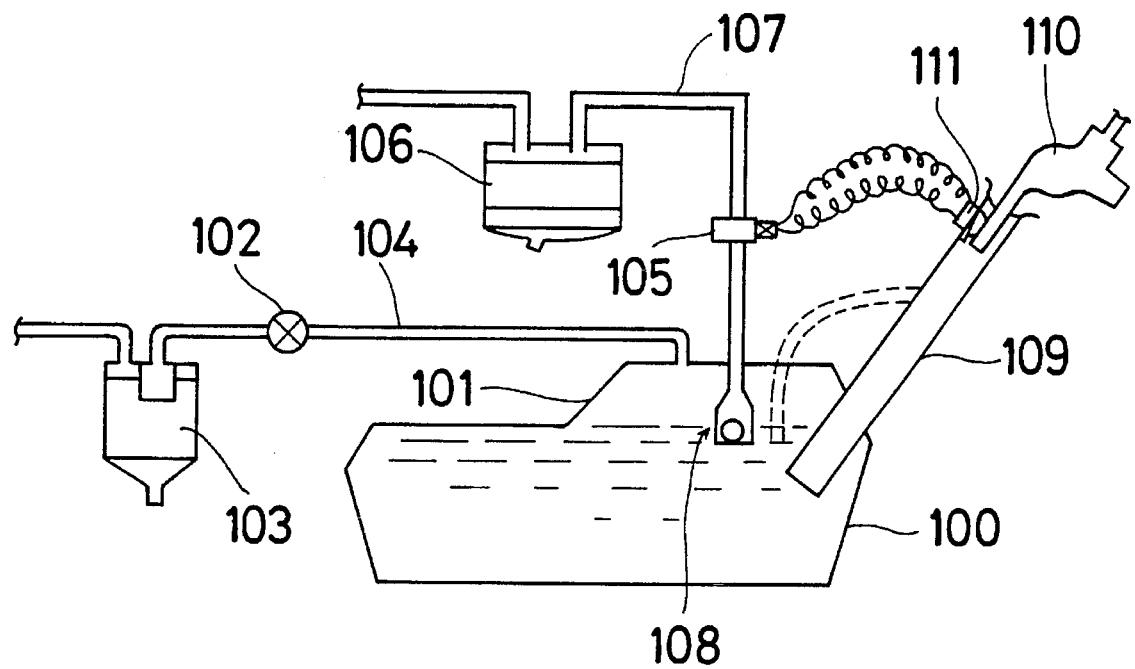
FIG. 3 shows a system around a fuel tank.
Figure 4:
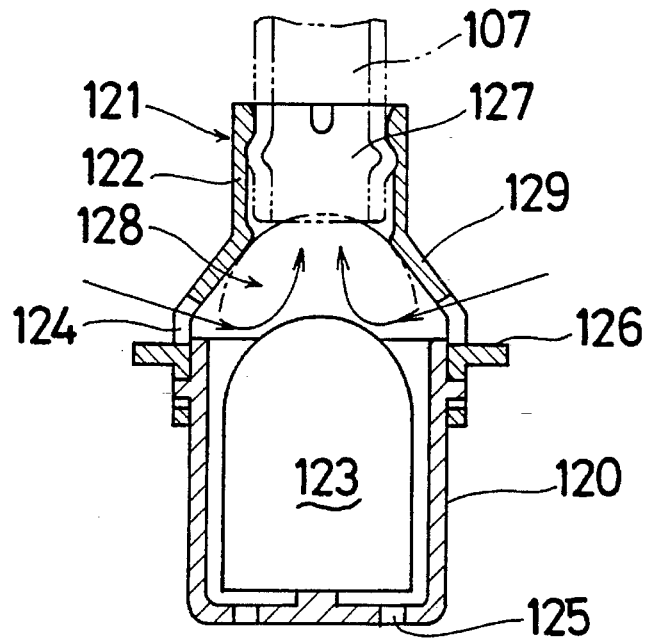
FIG. 4 is similar to FIG. 1, but shows a conventional fuel control valve.

Referring first to FIG. 1 wherein a fuel control valve 10 is shown. The valve 10 may replace the conventional fuel control valve 108 shown in FIG. 3. The valve 10 comprises a cylindrical body 12, a cup-shaped cover 13 and a reversed cup-shaped float 30. The cover 13 is engaged with the body 12 by notches 42 and forms a space 43 therein. Plural vapor inlets (windows) 14 are formed on a cylindrical wall 41 of the body 12. A ring-shaped flange 15 is elongated innerwardly from the wall 41 and is located above the inlets 14. A vapor outlet (upper hole) 16 is formed in a center of the flange 15 and has fluid communication with a ventilation pipe such as that shown in FIG. 3. An inside diameter of the ventilation pipe is smaller than an outside diameter of the outlet 16. Plural liquid inlets (lower holes) 17 are formed in a bottom 13a of the cover 13 and are fan shaped (shown in FIG. 2), for example. The outlet 16 is located higher than both of the inlets 14,17. A lower vertical wall 13b of the cover 13 is formed continuously with the bottom 13a of the cover 13. The wall 13b contacts the cylindrical wall 41 by a clearance. An inclined wall 18 is formed continuously with the vertical wall 13b and is widened upwardly. An upper vertical wall 19 is forked continuously with the inclined wall 18. Thus, a gap G is formed between the cylindrical wall 41 and the vertical wall 19. An upper end of the vertical wall 19 is at the same level as an upper end of the inlets 14. The upper end of the wall 19 may be higher than the upper end of the inlets 14. The inclined wall 18 and the vertical wall 19 form a wrapper 20. The wrapper 20 is wholly opposed to the inlets 14. A ring-shaped seal 32 is formed on a top surface 31 of the float and may contact on a ring-shaped seat 21 formed on the flange 15. A spring 33 is located between a projection 22 of the cover 13 and the bottom of the reversed cup-shaped float 30. The specific gravity of the float 30 is larger than that of the fuel (gasoline). A discharge passage 34 connects between the inlets 14 and the outlet 16.

The operation of the fuel control valve 10 is as follows:

When fuel is being supplied into the tank, the fuel level in the tank is lower than the position of the float 30. Thus, the ring-shaped seal 32 of the float 30 is spaced apart from the seat 21 and a large amount of fuel vapor flows from inlets 14 to outlet 16 through the passage 34 in the valve. When the tank is filled up the seal 32 of the float 30 presses on the seat 21 with the urging force of the spring 33. As a result, the passage 34 is shut off.

As the vehicle consumes the fuel in the tank, the fuel level therein becomes low. As a result, the seal 32 of the float 30 becomes spaced apart from the seam 21 again. When the vehicle runs on, the vehicle and the tank 100 vibrate. Therefore, fuel in the tank splashes about. Drops of the fuel flow into the valve 10 from the inlets 17 but the float 30 prevents the drops from flowing out to the outlet 16. On the other hand, the wrapper 20 prevents the drops from flowing into the inlets 14 directly. Other drops of the fuel splash over the wrapper 20 but run on the protected portion 41a of the cylindrical wall 41 and fall down to the inclined wall 18. Finally, the drops flow to outside of the valve 10 through the inlets 14,17.

We claim:

1. A fuel control valve comprising:

a housing;

a vapor inlet formed on a wall of the housing;

a vapor outlet formed on the housing and located higher than the vapor inlet;

a liquid inlet formed on a bottom of the housing;

a float located in the housing and positionable for opening and closing communication between said vapor and liquid inlets and said vapor outlet;

a wrapper connected at a bottom end thereof with an outside of the housing, and an upper end of the wrapper being at least as high as an upper end of the vapor inlet; and an opening formed at the upper end of the wrapper and communicated with the vapor inlet.

2. A fuel control valve of claim 1 wherein the housing comprises a cylindrical body and cup-shaped cover, the cylindrical body having said vapor inlet and vapor outlet, and the cup-shaped cover having said liquid inlet.

3. A fuel control valve of claim 2 wherein a lower vertical wall of the cover is formed continuously with a bottom of the cover, an inclined wall being formed continuously with the lower vertical wall and being widened upwardly, and an upper vertical wall being formed continuously with the inclined wall.

4. A fuel control valve of claim 3 wherein the inclined wall and the upper vertical wall form the wrapper.

* * * * *